(12) United States Patent
Thommana et al.

(10) Patent No.: US 8,744,476 B1
(45) Date of Patent: Jun. 3, 2014

(54) NON-COOPERATIVE SPECTRUM SHARING BY SMART FREQUENCY AGILE COGNITIVE RADIOS

(75) Inventors: John Thommana, Cedar Rapids, IA (US); Lizy Paul, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1475 days.

(21) Appl. No.: 11/824,687

(22) Filed: Jul. 2, 2007

(51) Int. Cl.
*H04W 72/00* (2009.01)
(52) U.S. Cl.
USPC ............................ 455/454; 455/453; 455/445
(58) Field of Classification Search
USPC .......... 455/454, 41.1, 41.2, 507, 63.4, 80, 83, 455/553.1, 562.1, 453, 422.1, 445; 370/342, 338
See application file for complete search history.

(56) References Cited

U.S. PATENT DOCUMENTS

| | | | |
|---|---|---|---|
| 7,126,913 B1 | 10/2006 | Patel et al. | |
| 7,154,938 B2 | 12/2006 | Cumeralto et al. | |
| 7,177,377 B2 | 2/2007 | Wu et al. | |
| 7,218,937 B2 | 5/2007 | Peltola et al. | |
| 2007/0091998 A1* | 4/2007 | Woo et al. | 375/240.02 |
| 2007/0253394 A1* | 11/2007 | Horiguchi et al. | 370/338 |
| 2008/0165754 A1* | 7/2008 | Hu | 370/342 |
| 2008/0194925 A1* | 8/2008 | Alsafadi et al. | 600/301 |
| 2008/0207131 A1* | 8/2008 | Coersmeier | 455/62 |
| 2008/0207204 A1* | 8/2008 | Vlantis et al. | 455/435.2 |
| 2008/0293353 A1* | 11/2008 | Mody et al. | 455/1 |

* cited by examiner

*Primary Examiner* — Ajit Patel
(74) *Attorney, Agent, or Firm* — Donna P. Suchy; Daniel M. Barbieri (57) ABSTRACT

A radio node in a radio network is disclosed. The radio node also includes signal processing hardware. The radio node also includes radio frequency (RF) transceiver hardware. Further, the radio node includes a smart spectrum sensor for feature detection capable of detecting multiple features including at least one of specific pilot signals, specific modulations, spectral widths, and symbol durations.

3 Claims, 11 Drawing Sheets

NON-COOPERATIVE SPECTRUM SHARING BY SMART FREQUENCY AGILE COGNITIVE RADIOS

BACKGROUND

Conventional military networks are mobile ad hoc wireless networks. In these networks every node acts as a router and can route traffic to other nodes. Such networks pose stringent requirements for security and reliability. They are highly dynamic in nature because mobile ad hoc networks are formed over wireless links. Links are susceptible to failures because of the mobility of nodes, or loss of connectivity due to the volatility of wireless links. Strict requirements on security and reliability combined with the dynamic nature of the network provide a strong motivation for self-forming, self-configuring, and self-healing capabilities in the network.

Figure 1:
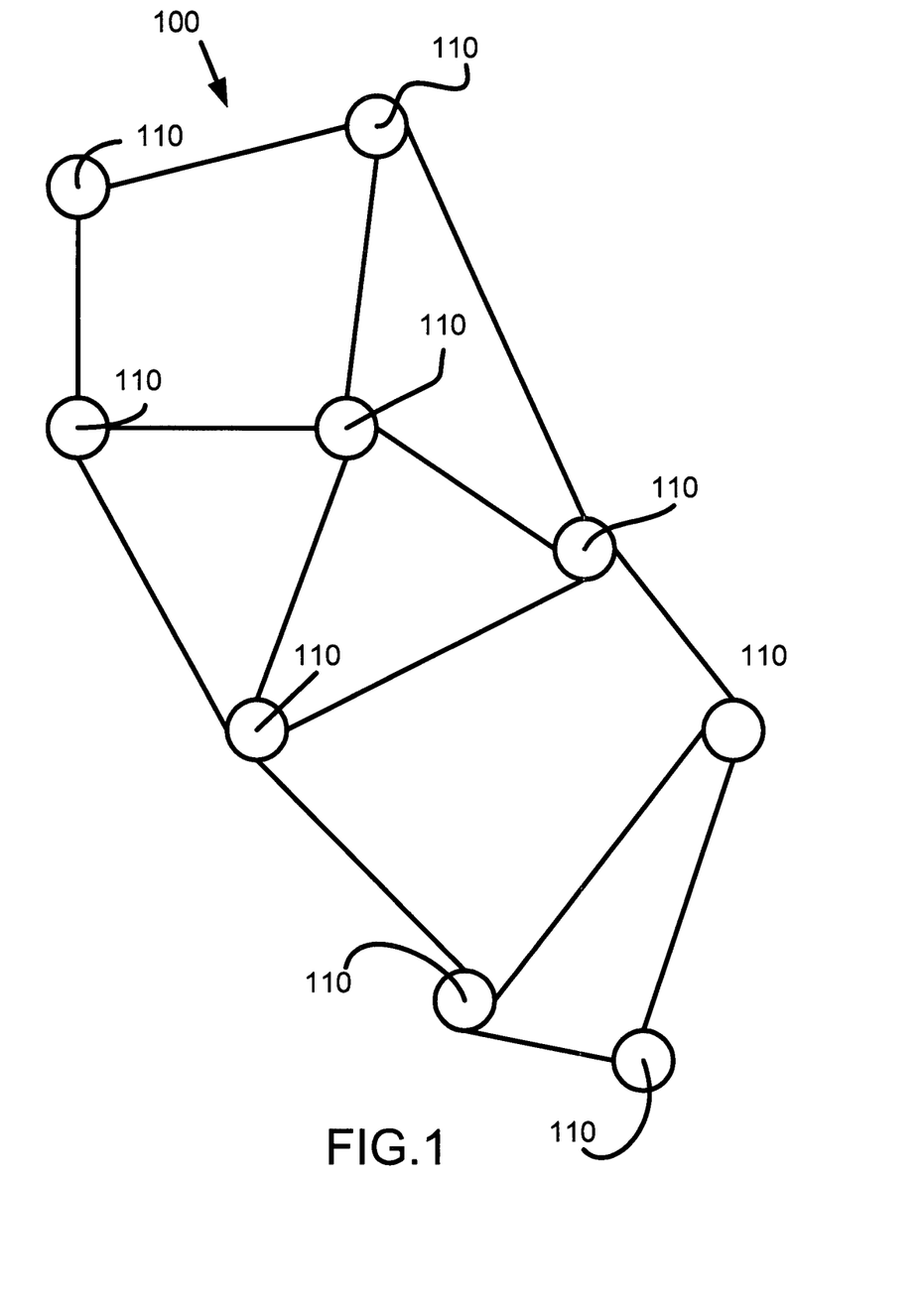
FIG. 1 is an exemplary diagram of a network of radio nodes.

Because of the mobility and power constraints, wireless communication nodes have made the task of ad-hoc network management very difficult. Current research is focused on auto-network management and policy based network management. One major disadvantage of both auto-network management and policy based network management is that every node can have only a limited view of the network and has to work within the limitations of its view. For example, FIG. 1 depicts a nodal communication network 100 in which each node 110 can talk to or can have information about its neighboring node(s), depicted by the connection lines between the nodes 110.

SUMMARY

What is provided is a radio node in a radio network. The radio node also includes signal processing hardware. The radio node also includes radio frequency (RF) transceiver hardware. Further, the radio node includes a smart spectrum sensor for feature detection capable of detecting multiple features including at least one of specific pilot signals, specific modulations, spectral widths, and symbol durations.

What is also provided is a method of smart spectrum sensing. The method includes breaking up the sensing operation into frames. Further, the method includes generating a first sensing cycle in a sensing hyper-frame to sense the entire spectrum. Further still, the method includes sensing cycles of the hyper-frame where only bands that have not been classified as occupied by high power interferers will be sensed.

Further, what is provided is a radio node in a radio network. The radio node includes signal processing hardware and a radio frequency (RF) transceiver hardware; and a route management protocol that supports sensing metric exchange. The sensing metric exchange is used to determine the channel state information.

Further still, what is provided is a method of spectrum sharing. The method includes exchanging spectral content metrics between neighboring network radio nodes. The method also includes determining the channel state information of first and second order neighbors. Further what is provided in the method is choosing at least one of antenna type, modulation, and transmit power based on the channel state information.

Yet, further what is provided is a method of spectrum sharing for a radio network. The method includes selecting ambient noise space as a potential communication opportunity. The method also includes identifying a primary use of the band. Further, the method includes identifying potential communication opportunities based on data rate, quality of service (QOS), power requirements, and primary user interference potential.

Yet, further still what is provided is a method of spectrum sharing for a radio network. The method includes using channel sounding to determine communication parameters. The method also includes initiating a spectrum metric exchange to create a spectral capability. Further, the method includes creating a communication opportunities metric that can be exchanged between users.

Still further, what is provided is a method of spectrum sharing for a radio network. The method includes providing more than one radio network node. The method also includes communicating between the radio network nodes. Further, the method includes using communication system aware spectrum stealing to ensure spectral usage opportunities.

Alternative exemplary embodiments relate to other features and combinations of features as may be generally recited in the claims.

BRIEF DESCRIPTION OF THE DRAWINGS

A better understanding of the features and advantages of the invention will be obtained by reference to the following detailed description that sets forth illustrative embodiments by way of example only, in which the principles of the invention are utilized, and the accompanying drawings, of which.

DETAILED DESCRIPTION

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Figure 2:
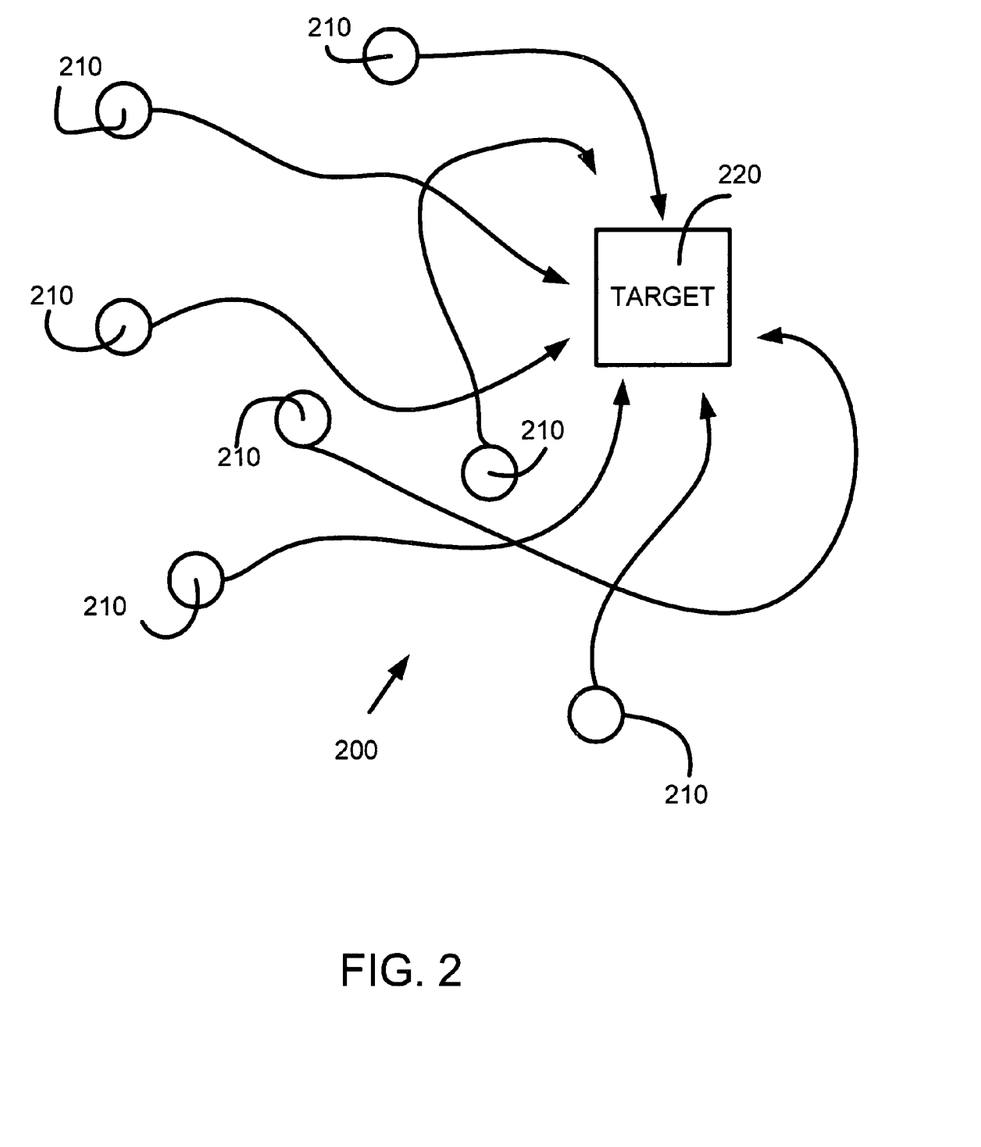
FIG. 2 is an exemplary diagram of a network of radio nodes moving toward a target.

Mobility in ad-hoc networked nodes causes dynamic network formation and reformations. In current literature node mobility is considered to be a random function, especially in simulations, at every instant in time. The reality is that a majority of the ad-hoc network mobility is coordinated mobility. Consider the case of a small set 200 of soldiers 210 on a reconnaissance mission, each soldier may take a different path to approach the target 220 of the reconnaissance.

Policy Compliant Radio is a term used to describe one of the goals of the neXt Generation communications (XG) program. The core component of a Policy Compliant Radio is a smart frequency agile cognitive radio that can sense the radio spectrum over a wide frequency band, determine free spectral bands, and opportunistically use the free spectral bands without creating interference for the primary spectrum owner.

Figure 3:
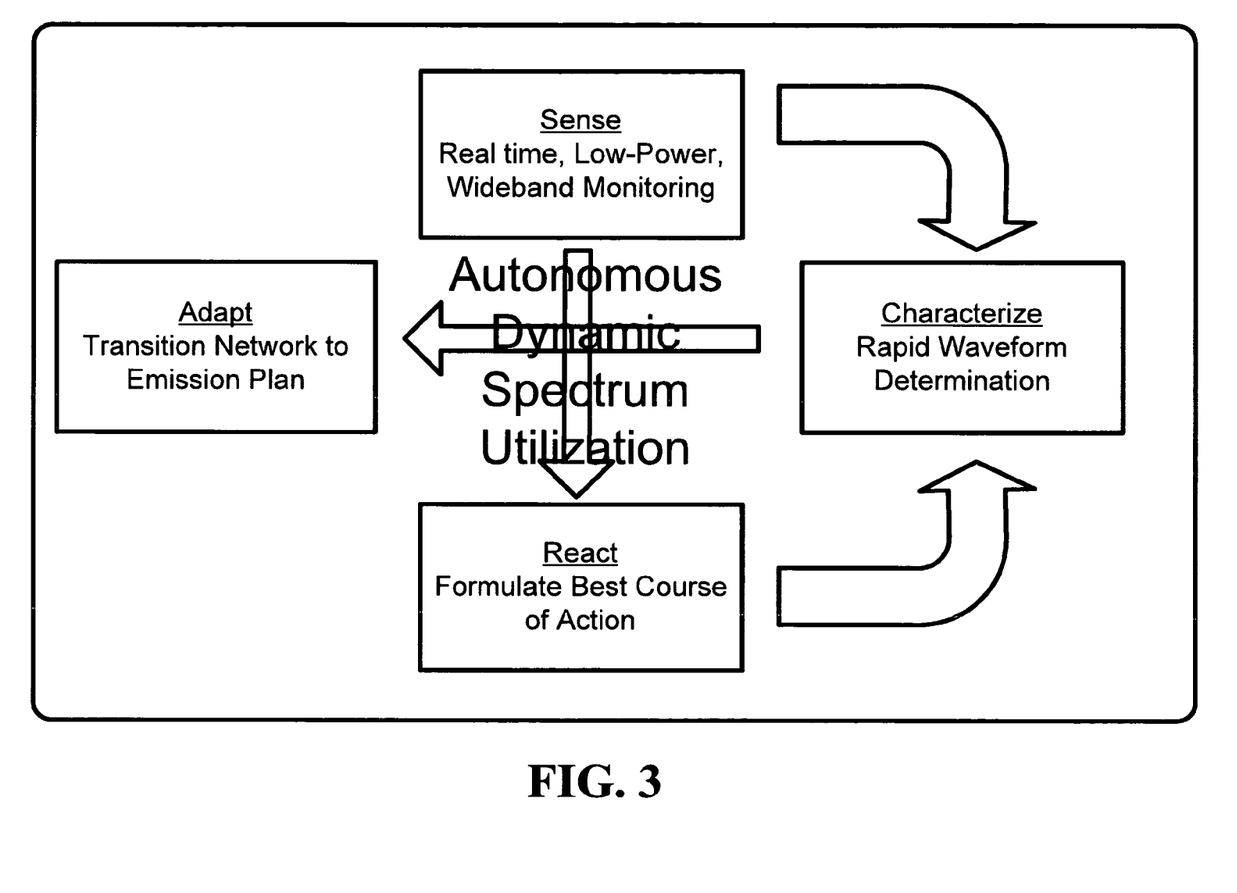
FIG. 3 is an exemplary flow diagram of spectrum utilization.

FIG. 3 illustrates the expected operation methodology of an XG sensor. The DARPA vision of next generation communication devices is a standardized policy aware cognitive radio. Every communication provider in the world will disseminate access and usage policies that adaptive cognitive radios can decipher to use the communication spectrum co-operatively. Multiple standardized spectrum sharing approaches are being formulated.

It is reasonable to assume that the first generation of XG sensors will be adaptively using the available spectrum in a non-cooperative fashion taking utmost care to ensure that the original spectrum owner is not adversely affected.

During the sensing process every band is classified into black spaces (occupied by high power interferers), grey spaces (occupied by low power interferers) and white spaces (ambient noise) based on radio activity. It is very easy to identify black spaces; the difficult part is classifying a band "grey" or "white". Proposed herein methods of sensing, detection, and communication opportunity exploitation to seamlessly support non-cooperative opportunistic spectrum usage are disclosed.

The rules of opportunistic spectrum usage are:

A primary band user (primary communicator) has full rights to the frequency band at all times.

A secondary band user (secondary communicator or opportunistic communicator) cannot create undue interference for the primary user.

A secondary band user must vacate the channel if it detects a primary user.

A secondary band user can share the channel if it detects other secondary users.

An energy detector is not an optimal solution as a smart spectrum sensor as it has the following shortcomings:

It cannot accurately set the threshold above which the energy in a band can be classified as presence of a communicator.

It cannot distinguish between a primary communicator and secondary communicator.

The shortcomings of an energy detector can be overcome by using a feature detector as a smart spectrum sensor. Feature detection is the process of identifying a communication system using cyclostationary signal processing. If a communication system emits cyclostationary signals (specific sampling rates, modulations, pilot signals etc.), it can be detected at much lower signal to noise ratios than using traditional methods. It is also capable of detecting and extracting parameters of different communicators in a band as long as they do not have the same periodicity. Thus a feature detector will be able to detect the possible presence of a GSM cellular phone using GMSK modulation, a TV transmitter using VSB and a WLAN AP using 64-QAM/OFDM as the spectral analysis will show multiple spikes at their individual periodicities.

Identifying the modulation scheme used by a communicator does not help us in any way to guess the primary owner of the spectral band. In order to make an educated guess with a high probability of success one will have to detect multiple features like the presence of specific pilot signals, specific modulations, spectral widths and symbol durations.

Feature detection is a very time and processing intensive operation. Depending on the spectral band, number of communicators and number of features per communicator that has to be detected there is a high probability that this might not be a feasible operation that can be done in real-time. The time taken for the feature detection and classification operation should be short enough to say that with a high probability the spectrum has not changed before the decision can be made.

Figure 9:
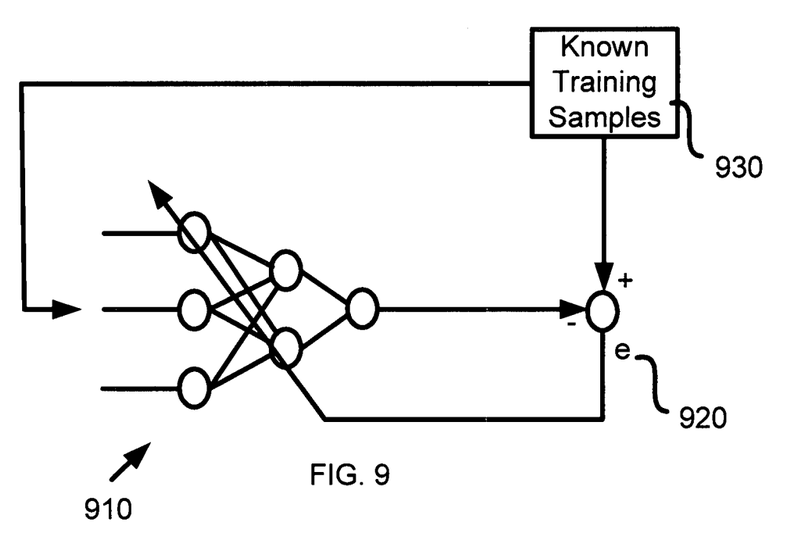
FIG. 9 is an exemplary diagram of a neural network feature detection system.
Figure 10:
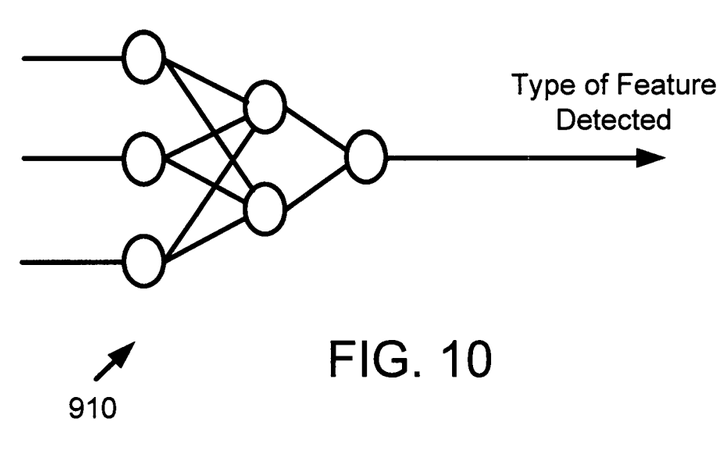
FIG. 10 is an exemplary diagram of a neural network feature detection system according to an exemplary embodiment.

Artificial neural networks may be used to speed up the operation. The training of the neural network can be done with spectral samples and the correct decision making learned from a traditional cyclostationary feature detector (see FIG. 9). This then translates to a traditional pattern classification problem for the neural network to determine the presence of a communicator and identity of commonly known communicators and its detection performance should tend towards that of the traditional feature detector but the response time is improved considerably. As depicted in FIG. 9, neural network 910 comprises a number of interconnected weighted functions. By changing the weightings based on an error 920 from a number of known training samples 930, neural networks 910 is able to approximate a feature detector, as depicted in FIG. 10.

Another solution is distributed feature detection. In distributed feature detection the opportunistic secondary communicators distribute the workload of detection and classification with each secondary communicator targeting a smaller subset of detectable primaries. This speeds up the channel characterization process and reduces the signal processing burden on individual opportunistic communicator. The local channel metric is then exchanged between the opportunistic communicators to identify communication opportunities.

There are two other issues that smart frequency agile cognitive radios have to overcome to operate opportunistically. They are:

How can a cognitive radio be sure that it is not causing interference to a primary user?

How can a cognitive radio distinguish between signal weakness due to propagation loss (distance) and fading or shadowing?

How can a cognitive radio distinguish between an absent signal and a barely detectable signal?

In order to be sure that it is not causing interference to a primary user, a cognitive radio has to be able to detect the signals of a primary communicator way beyond the specified receiver sensitivity of the primary communication system. This places a protective buffer between the secondary opportunistic users and the primary system users at the fringes. By using intelligent power control the opportunistic users can reduce the interference for the primary system fringe users.

Whenever a weak signal is detected by the spectral sensor, the cognitive radio has to make an estimation of whether the weakness of the signal is due to path loss (actual distance from the transmitter), shadowing (presence of obstruction) and multipath. Shadowing can be detected only by change in location. Multipath fading can be resolved by slight change in position. But the only way to resolve the issue for all cases is distributed sensing and detection as the probability of multiple users being in a fade or shadow with respect to the primary communicators signal is very low.

Interference Temperature is recommended as a metric for classifying every spectral bands into black spaces (occupied by high power interferers), grey spaces (occupied by low power interferers) and white spaces (ambient noise) based on radio activity. Interference temperature is defined as the RF power measured (at the antenna of the spectrum sensor) per unit bandwidth. To classify a spectral band as "white" and not "grey" one has to determine the interference temperature threshold which is dependent on the primary communication system parameters. The feature detection process when combined with some form of knowledge of approximate frequency allocations or systems that are known to have dedicated bands (like cellular, TV etc.) can be used to determine the primary spectrum owner. Based on the detection of the primary system owner one can determine the interference temperature threshold for the spectral band.

Figure 4:
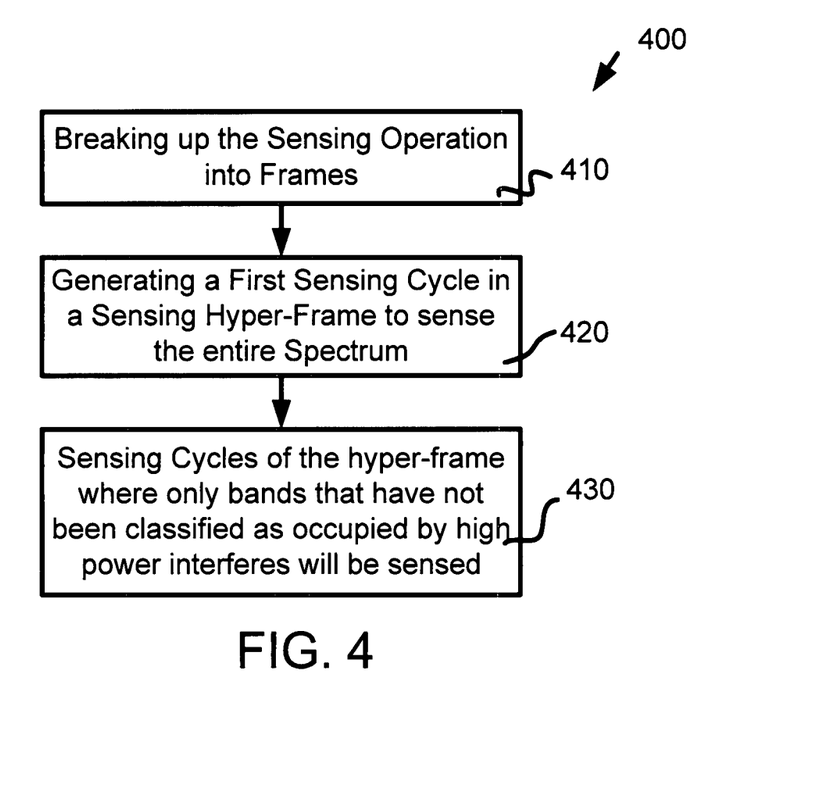
FIG. 4 is an exemplary process diagram of an exemplary embodiment.

The spectrum sensing and classification operation is a power hungry operation. Smart sensing techniques will be needed to reduce the scanning and classification process without unduly interfering with primary and secondary spectrum users. One embodiment of smart sensing is to breakup the sensing operation into frames (process 410) as depicted in process 400 of FIG. 4. Each sensing cycle is called a sensing frame and N sensing frames make up a sensing hyper-frame. The first sensing cycle in a sensing hyper-frame will always sense the entire spectrum (process 420). In the subsequent sensing cycles of the hyper-frame only bands that have not been classified as "black" will be sensed (process 430). The reasoning behind this is that if there are strong interferers in the band then we will not be using it and we can be reasonable sure that the spectrum will be occupied by the interferers for the duration of a hyper-frame. We can even add the "grey" areas to the avoidance list in the smart sensing approach. The decision to avoid "grey" areas in subsequent scans can be made dependent on the number of "white" areas found. Based on the number of "white" areas found we can make a decision on whether we need to avoid the "grey" areas or look for suitable "grey" that can be exploited.

Based on the analysis done above it is reasonable to assume that distributed sensing/detection coupled with spectral content metric exchange will be a key component of smart agile cognitive radios.

If distributed sensing/feature detection with spectral content metric exchange is employed then we have the choice of performing distributed sensing in a selective (sense and classify only when needed), active (always sense and classify) and/or hybrid (situation dependent) manner.

The problem of exchanging sensing and detection metrics is similar to that of ad-hoc route management. Rather than having a separate mechanism to exchange sensing/detection metrics the route management protocol can be extended to support sensing metric exchange. Having an integrated routing and sensing protocol increases the overall throughput of the network by reducing collision opportunities and reducing messaging overheads.

Figure 5:
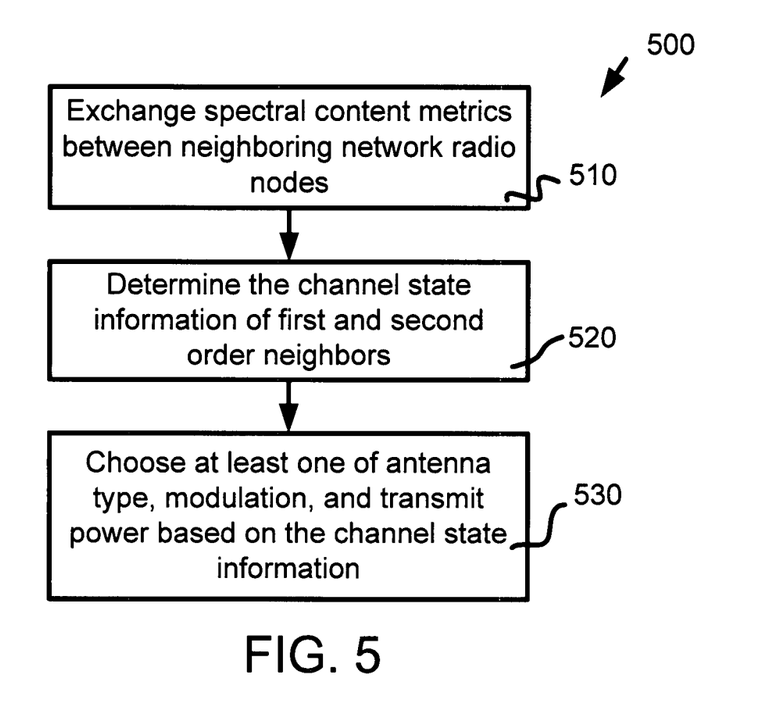
FIG. 5 is an exemplary process diagram of an exemplary embodiment.

Thus, an embodiment of the invention is to use the exchanged spectral content metric (process 510) as depicted in process 500 of FIG. 5 to determine the channel state information (how clean is the spectrum) of our first order and second order neighbors (process 520). Based on the channel state information one can choose to employ different antenna types (Omni, directional, MIMO), modulation and transmit power (autonomous power control) (process 530).

When more than two opportunistic communicators hijack a band then the decision to use the band has to be cooperative one. This requires the election of a leader to perform distributed sensing, feature detection and band selection.

If multiple secondary transmitters are using the same band then an in-band or out of band coordination scheme has to be devised to quiet all possible secondary transmissions during the sensing phase. This helps in reducing the signal processing burden to cancel out known or anticipated secondary communicators and then look for primary and unknown secondary user presence. It also reduces the uncertainty region (no signal presence or weak signal presence).

Figure 11:
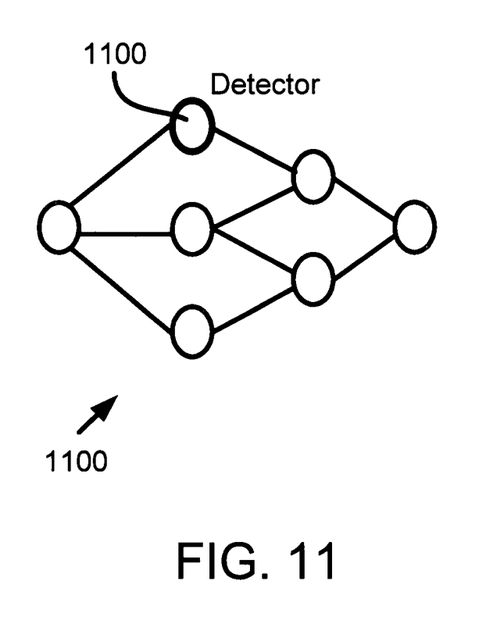
FIG. 11 is an exemplary diagram of a feature detection system according to an exemplary embodiment.

One embodiment will exchange multicast "detection order" messages that will be decoded by secondary opportunistic users to determine their sensing, detection and reporting duties and the response will be sent to the elected leader 1110 of radio nodes 1100 (FIG. 11) for decision making.

Another embodiment will be using spectral sensing start and end radio signature markers. These specially coded markers sent by the elected leader(s) can be used to start and stop sensing cycles and also as a means of indicating to other opportunistic users that the band is occupied. This option can be used in commercial systems to reduce the band scanning overhead. The coding of the markers can also be used to indicate whether the interference metric for the band is reached so that other opportunistic users can make a decision on whether band sharing is possible.

Another embodiment of cooperative spectrum sharing is primary owners putting out identifiable signals that indicate to opportunistic secondary users whether the band is available for sharing or not. This reduces the signal processing burden on the opportunistic users considerably.

A time coordinated sensing algorithm will be the most efficient distributed sensing scheme as an un-coordinated sensing algorithm will reduce the amount of data (traffic) that can be exchanged in the band or increase the uncertainty band of the sensing algorithm. This implies the presence of a time synchronization scheme or positioning capability like GPS that can also permit accurate time management. Using the coordinated scheme we can rely on all trusted nodes or nodes manufactured by a specific vendor or nodes following a specific standard to abide with the transmission ban.

As with routing protocols the issue of trust also creeps in. What if a secondary node distributes incorrect spectral content metrics? Decision logic has to be put in place that can invalidate potentially incorrect metrics by using the majority vote or relative position of dissenter etc. to determine if there is a malicious terminal that is performing a denial of service activity in the band by reporting false metric and causing all secondary communicators to vacate the band.

Figure 6:
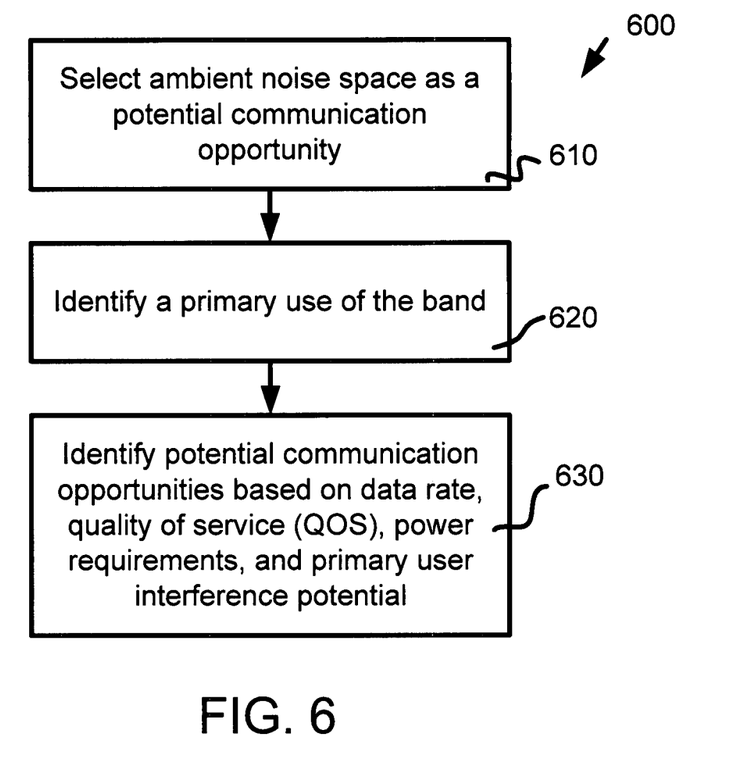
FIG. 6 is an exemplary process diagram of an exemplary embodiment.

In accordance with exemplary embodiments, in order to safely use a channel, one must be able to translate the spectral analysis classification into Communication Opportunities (CO). Communication opportunity identification can be done as follows:

Select a white space as a potential communication opportunity (process 610) as depicted in process 600 of FIG. 6.

Identify the primary user of the band (process 620). A device that has just powered up and started a spectral scan cannot assign a primary user to that white space. An embodiment is to create a list of potential primary communicators for a band and setting the interference temperature metric based on the one with the lowest receiver sensitivity. The feature detector has to be given the task of identifying all possible primary communicators in the band. Once a primary communicator has been identified the physical location, frequency band and primary communicator's details can be stored for future use.

Identifying potential communication opportunity in terms of data rate, QoS, power requirements and primary user interference potential (process 630). An embodiment of this invention can be to use some form of channel sounding to determine the best communication parameters (process 710) as depicted in process 700 of FIG. 7. Another embodiment is to initiate a spectrum metric exchange so that a spectral capability map can be created (process 720) and the best communication parameters established based on a function of spectral metric.

Figure 7:
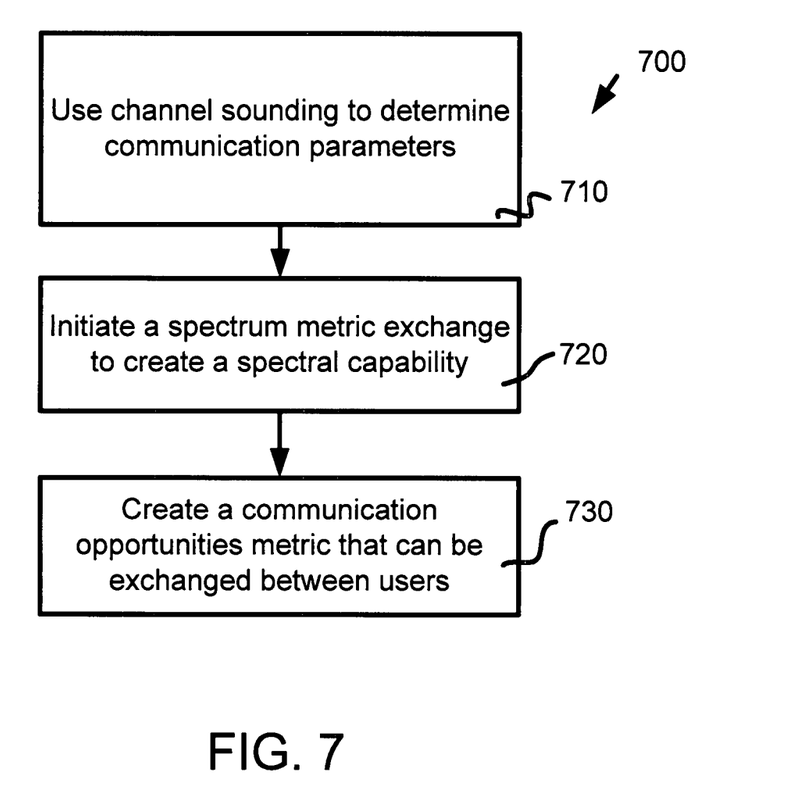
FIG. 7 is an exemplary process diagram of an exemplary embodiment.

Creating a communication opportunity metric (COM) that can be exchanged between users (process 730). This is a very important phase as neighboring nodes will have differing communication opportunity metrics due to fading, shadowing, proximity to primary communicator, proximity to interferers etc. The opportunity selected will be based on exchanging metrics and deciding the best opportunity to be used. Communication opportunity metric can be exchanged in a reactive or pro-active fashion as in routing.

Selecting a communication opportunity that is suitable for all entities involved in the secondary communication.

One can be reasonably sure that there will be multiple communication opportunities at any instance in time due to the fact that the available spectrum is very large (30 MHz-3 GHz). Selecting one of the communication opportunities randomly and informing the opportunistic communicators of the communication parameters is an option. This option continues to place a signal processing burden on all the communicators as the spectral sensing has to be maintained to ensure availability of the communication opportunity.

As part of identifying a communication opportunity the opportunistic users have to identify a set of communication parameters that will ensure non-interference to all primaries in the vicinity. In addition to identifying the communication parameters the opportunistic users have to identify an area of operation in which the selected communication parameters will guarantee non-interference with adjacent primaries. This is achieved by computing the potential reaches of secondary communicators along the outer edges and distributing the out of bounds coordinates. Thus every device prior to transmission will ensure that the transmit power used will not cross the specified boundaries. In addition a subset of secondary communicators on the outer periphery will be elected to perform spectral scanning for primaries. In this manner opportunistic communicators not elected for the spectral scanning duties can save power by not performing a spectral scan or performing a reduced duty cycle spectral scan.

Most military communication handsets are capable of supporting multiple independent communication sessions using configurable independent radios. An embodiment of reduced spectral scanning is to select a subset of opportunistic communicators to configure one of their radios as a receive only primary communicator. For example if the primary communication system is DVB-H (mobile TV) and the secondary communicators are exploiting one of the free DVB-H channels, then the selected radios can sleep most of the time but wake up at prescribed times to listen to the Network Information Table (NIT) and Transmission Parameter Signaling (TPS) messages broadcast by the DVB-H transmitter which informs a receiver about transport streams details like frequency, symbol rate, location and other related information. Based on the information in the messages one can determine if the communication opportunity will continue to exist or will terminate soon. Since the radios are only deciphering a limited subset of messages sent at specified durations a receiver will be asleep most of the time and the power consumption will be much less than using a spectral sensor. Similar opportunities exist for mimicking a GSM, IS-54/IS-136, DECT, CDMA2000, UMTS, Digital Audio Broadcast, Digital Multimedia Broadcast, ATSC devices.

Figure 8:
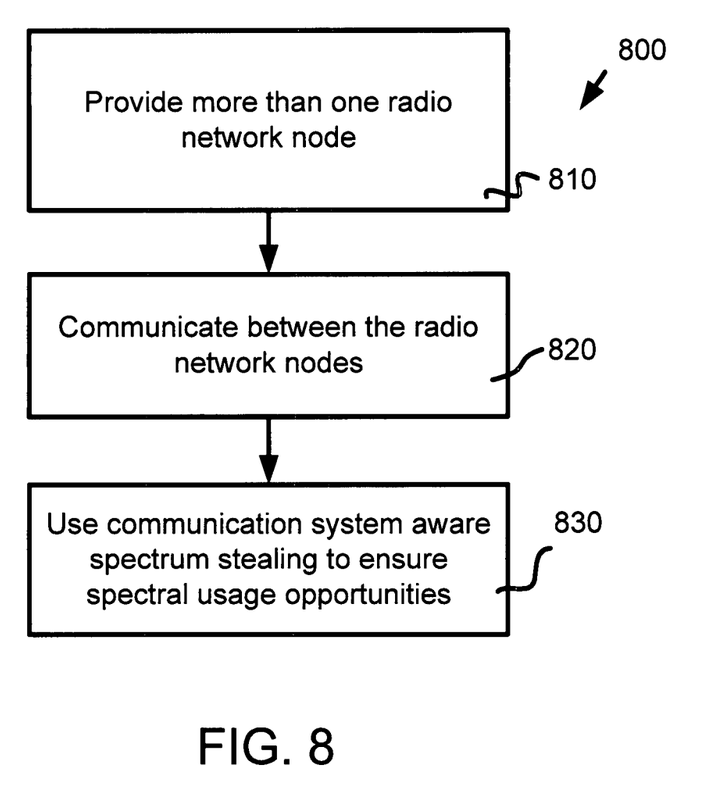
FIG. 8 is an exemplary process diagram of an exemplary embodiment.

Another embodiment of the invention is to use communication system aware spectrum stealing (process 830) as depicted in FIG. 8. Once radio network nodes have been set up (process 810) and communication takes place between the nodes (process 820), this embodiment uses knowledge of the primary communicator's internal details to ensure longer spectral usage opportunities. For example, we can exploit the channel management scheme used by the base stations and cellular phones. The base station performs periodic RSSI measurement cycles on the set of mobile to base (uplink) frequencies allocated to it. The frequencies are then ordered in best to worst order. Whenever a new channel resource is needed the base station allocates them from the ordered set best to worst. This ordering of the mobile to base (uplink) frequencies automatically orders the downlink frequencies as they are paired. Whenever a secondary communicator steals an unused cellular channel the base stations measurement cycle will detect the interference and re-order the frequency list by putting the channel lower in the assignment order. This is a very useful fact to be exploited as it guarantees the secondary communicator a longer duration of usage till all other good interference free channels are used up. Even if the secondary communicator is using power control to ensure no interference to the cellular system, it is in the best interest of a secondary communicator to set the communication level to a higher threshold so that its allocation by the base station is delayed. The base station will use the channel ultimately when it runs out of all good channels and when that happens the opportunistic communicator finds another communication opportunity.

For military communication systems LPI/LPD is important. All secondary communicators will generally ensure that the communication parameters used will be different from that used by the primary communicator. This ensures ease of detection and there will be no confusion in identifying the primary communicator. For military communication systems the requirements is the opposite that once it identifies the primary communicator it will mimic the primary communicator's system parameters as closely as possible to prevent distinction. Subtle deviations that cannot be easily detected using cyclostationary signal processing can be used for differentiation if needed. The best option would be to be the primary communicator, use the primary communicator's protocol to exchange encrypted data. As soon as a true primary communicator's packet is detected the opportunistic communicators move away.

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. A radio node in a radio network, comprising:
signal processing hardware;
radio frequency (RF) transceiver hardware; and
a smart spectrum sensor for feature detection capable of detecting multiple features including at least one of: specific pilot signals, specific modulations, spectral widths, and symbol durations, wherein the smart spectrum sensor implements an artificial neural network,
wherein said radio node is one of opportunistic secondary communicators in the radio network, and the smart spectrum sensor of said radio node is a part of a distributed feature detection system utilized by the opportunistic secondary communicators to detect communication opportunities, wherein said distributed feature detection system utilizes the opportunistic secondary communicators to distribute computing workload of detection and classification with the smart spectrum sensor of each secondary communicator targeting a smaller subset of detectable primary communicators, the secondary communicators exchanging a local channel metric for identifying communication opportunities without creating interference for a primary communicator in the radio network, wherein said exchanging is supported by a route management protocol of the radio node, and wherein said distributed feature detection system is a time-coordinated distributed feature detection system.

2. The radio node of claim 1, wherein the smart spectrum sensor for feature detection is capable of detecting multiple features including specific pilot signals, specific modulations, spectral widths, and symbol durations.

3. The radio node of claim 1, wherein the radio node is configured to vacate its communication opportunities when a primary communicator is detected.

* * * * *